United States Patent [19]
Brücher et al.

[11] 3,804,475
[45] Apr. 16, 1974

[54] RADIAL BEARING WITH ADJUSTABLE SHAFT SUPPORT

[76] Inventors: Rudolf Brücher, Wittekindstr. 11, Mulheim-Ruhr; Rudolf Gemein, Falkenhagener Str. 11, Berlin, both of Germany

[22] Filed: Nov. 9, 1972

[21] Appl. No.: 304,924

[30] Foreign Application Priority Data
Nov. 9, 1971 Germany............................ 2155519

[52] U.S. Cl. ................................................ 308/122
[51] Int. Cl. .......................................... F16c 23/00
[58] Field of Search ........................... 308/245, 122

[56] References Cited
UNITED STATES PATENTS
3,044,838   7/1962   Winer et al. ...................... 308/122

Primary Examiner—Charles J. Myhre
Assistant Examiner—Frank Susko
Attorney, Agent, or Firm—Herbert L. Lerner

[57] ABSTRACT

In a radial bearing suitable for use with a machine shaft having an adjustable support structure which can compensate for undesirable operational forces, a bearing housing surrounds upper and lower bearing sleeves in which the lower sleeve and an adjustment member are positioned in a hemispherical bearing support. In turn, this support rests on the bottom plate of a bearing support block. Adjustment of the bearing sleeves is effected by having a space intermediate the bottom plate and the hemispherical bearing support continuously lubricated via a high pressure lubricating system. Additional lubricating medium in the gap between the shaft and bearing sleeves, serves to provide lubrication to the bearing support, as operational speed is attained and the high pressure oil system is turned off.

7 Claims, 3 Drawing Figures

RADIAL BEARING WITH ADJUSTABLE SHAFT SUPPORT

The present invention is directed to a radial bearing assembly for machine shafts. More particularly, the present invention is concerned with an improved radial bearing suitable for use with turbogenerators.

By way of background, in order to adjust the bearing of shafts normally found in high-speed machines, it is necessary to take the deflection of the shaft into account. In this connection it is known to provide the bearing members, which are usually made in two sections, with spherical seating surfaces. These seating surfaces in turn are supported on spherical surfaces of the bearing housing. Because of the large radius of spherical contact surfaces and the high frictional forces resulting therefrom, automatic readjustment of the bearing members during the operation of the machine is practically impossible. From the aforementioned, with existing designs it is not readily possible to avoid undesirable forces at the bearing sleeves, which can result in substantial bearing damage. This condition is particularly prone to occur during the operation of a turbogenerator which is undergoing changes in position and location of bearing blocks, as a result of unilateral thermal radiation or varying dynamic bending lines in the shafts.

It is the main object of the present invention to avoid the defects of the prior art.

It is another object of the present invention to provide a radial bearing suitable for use with turbogenerators which can adjust itself automatically under any operating conditions.

A further object of the present invention is to provide a bearing assembly having bearing journals which are vertually exactly seatable in the supporting bearing surfaces.

Still another object of the present invention is to provide a bearing assembly suitably supported by structural members that are disposed under liquid friction conditions.

Another object of the present invention is to provide the lower bearing sleeve of the bearing assembly with support means that are in liquid frictional relationship one to another.

It has been discovered that in bearing assemblies, where the lower bearing sleeve is held by a separate hemispherical bearing support which in turn is supported in a corresponding spherical cup of the bearing block; that is seating the bearing sleeve in a separate, hemispherical bearing support, of a relatively small friction radius that is supported hydraulically, automatic readjustment of the bearing is possible. Furthermore, during the operation of machines, such as turbogenerators, undesirable end forces are reliably minimized.

To further enable displacement of the shaft, the lower bearing sleeve and the bearing support is disposed between an adjustment member of approximately U-shaped design and partially surrounds the shaft in the transverse direction. The bearing sleeve at the lower seat is provided with lateral recesses. The hemispherical bearing support is provided with a recess in the form of a cylinder sector on its top side and is adapted to receive the bearing sleeve or the above-mentioned adjustment member respectively. Liquid friction i.e., low friction forces of the bearing support is assured here by a load-carrying layer of lubricating oil which is maintained in the spherical cup between the bearing support and the bearing block. In this connection, a gap between the bearing support and the bearing block is connected to an operational high-pressure oil system for the lubrication of the bearings, resulting in continuous lubrication of the bearing support.

Other features which are considered characteristic for the invention are set forth in the appended claims.

Although the invention is illustrated and discribed herein as embodied in a radial bearing assembly for machine shafts, it is nonetheless not intended to be limited to the details shown, since various modifications and structural changes may be made therein without departing from the spirit of the invention and within the scope and range of the equivalents of the claims.

The construction and method of operation of the invention, however, together with additional objects and advantages thereof will be best understood from the following description of specific embodiments when read in connection with the accompanying drawings in which.

Figure 1:
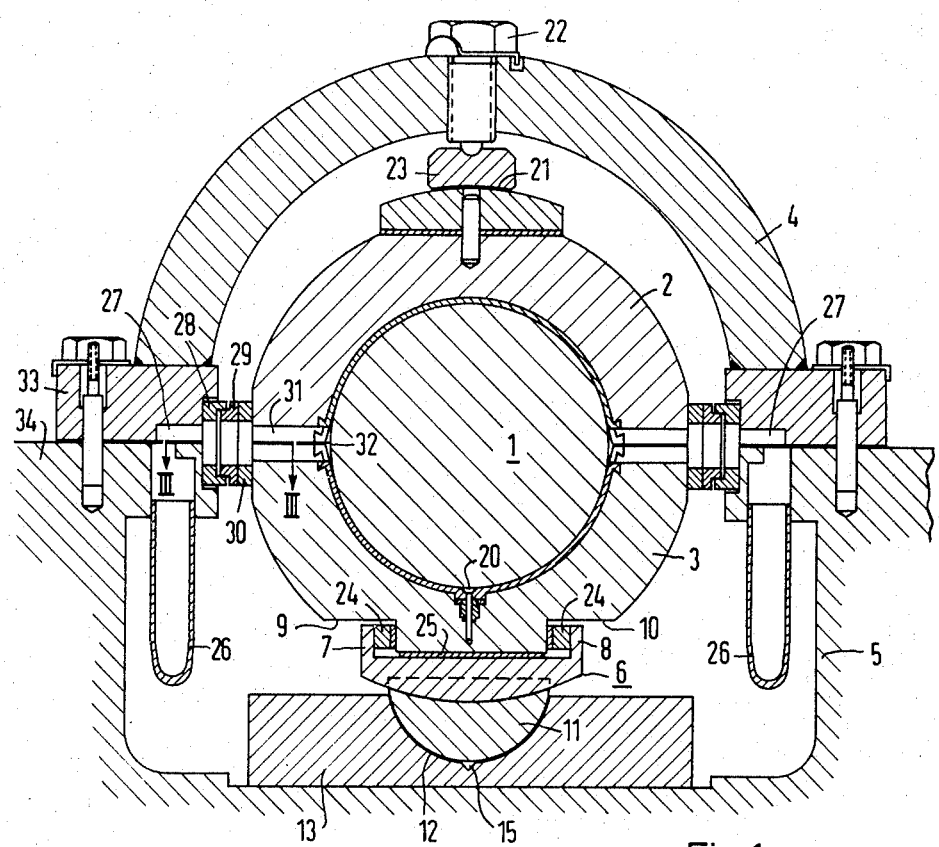
FIG. 1 is a cross section through a radial bearing according to the invention.

According to FIG. 1, the shaft of a machine, i.e., a turbogenerator, is surrounded at the bearing in a conventional manner by the two bearing half-sleeves 2 and 3, which are disposed within a bearing housing 4 and a bearing block 5. According to the embodiment shown, the lower bearing sleeve 3 is held in the customary manner first, by a U-shaped adjustment member 6 having two legs 7 and 8 which seat in two recesses 9 and 10 of the lower bearing shell 3 that are parallel to the axis of the shaft 1. Consistent with the invention, the lower bearing sleeve 3 and the adjustment member 8, respectively, are held on the bottom side of the structure by a hemispherical bearing support 11. This bearing support 11 has its spherical surface seated in a ball-cup-like recess 12 of a bottom plate 13, which bottom plate, in turn, is integral with the bearing block 5. Still another recess 14 located in the top surface of block 5 (see FIG. 2) is in the shape of a cylindrical sector and is adapted to receive the bearing sleeve 3 or the adjustment member 6, respectively.

Figure 3:
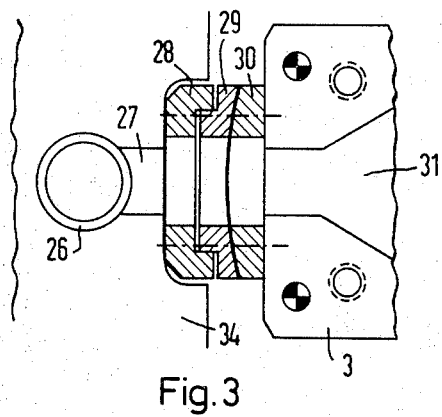
FIG. 3 is a cross section through the corresponding members of the lateral bracing of the bearing sleeves along the section line III—III of FIG. 1.
Figure 2:
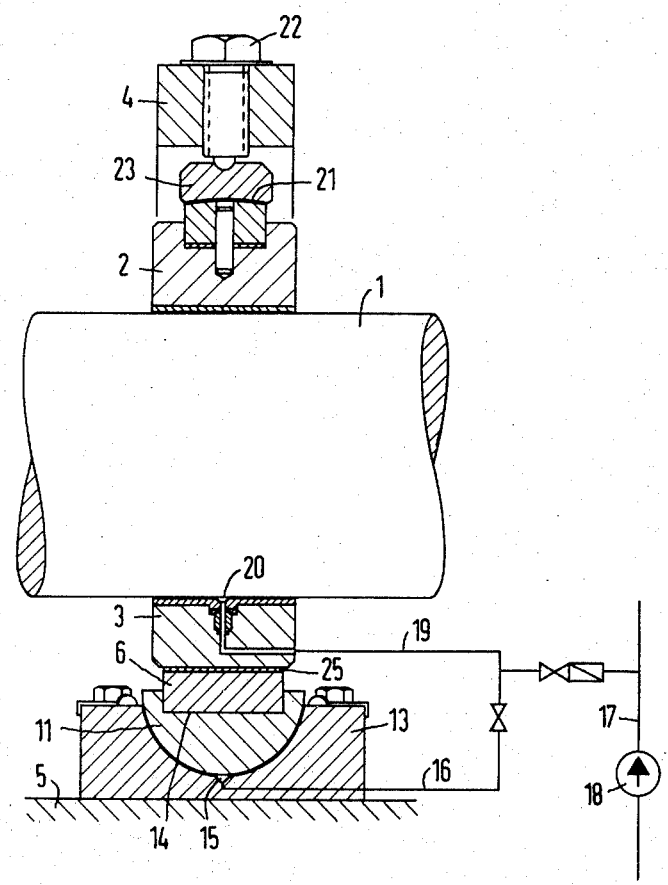
FIG. 2 is a longitudinal cross section along the section line II—II of FIG. 1.

In accordance with FIG. 2, automatic adjustment of the bearing sleeves 2 and 3 during operation of the turbine is assured by having the hemispherical bearing support 11 resting on a layer of lubricating oil. For this purpose, a gap 15 between the bearing support 11 and the bottom plate 13 is initially connected via a line 16 to the high-pressure oil system 17 utilizing a high-pressure oil pump 18. Simultaneously, high-pressure oil system 17 is introduced via a line 19 and supplies lubricating oil to the bearing gap 20 between the shaft 1 and the bearing sleeves 2 and 3. Once the turbogenerator is started-up, bearing support 11 is continuously lubricated by the high-pressure oil system 17. As operational speed of the turbogenerator is attained and the high-pressure oil system is turned off, the bearing support is lubricated by pressurized oil of the oil wedge in the gap 20 which gap is disposed between the shaft 1 and the bearing sleeves 2 and 3. Lines 26 and conduits 27, shown in FIG. 3, supply oil to the bearing flanges 33 and 34, as well as, between closely fitting members 28, 29, 30 and the channel 31. The channel 31 is machined into the parting line of the bearing sleeves 2 and 3, and leads into an oil supply reservoir 32. As a result, the bearing support 11 is continuously supported under liquid-friction conditions. Should the location of bearing blocks and foundations change due to such conditions as unilateral thermal radiation, variations in the dynamic bending lines of the shaft, etc. an exact fit of the shaft journals to the bearing surfaces is assured due to the above mentioned lubrication; and the elimination of undesirable forces which cause most of the bearing damage. Beyond this, the transmission of shaft vibrations to the bearing system is considerably reduced by the hydraulic damping properties of the hemispherical bearing support resting on a lubricating layer.

Further support for the bearing sleeves 2 and 3 is accomplished in a customary manner via member 21 which is provided with a spherical seating surface on the top side of the upper bearing sleeve 2. An opposing member 23 having a spherical underside is positioned to cooperate with member 21 and is adjusted by means of screw 22. An adjustable amount of play between the upper bearing sleeve 2 and opposing member 23, which for example can range from between 0.05 to 0.1 mm, depend on the size of the bearing. Additionally, appropriate shims 24 and 25 (see FIG. 1) positioned between the lower bearing sleeve 3 and the adjustment member 6, enables precise adjustment of the bearing sleeves during installation. In addition, the shafts can also be radially aligned with respect to one another.

For lateral bracing and adjustment, fitting members 28, 29 and 30 are provided between bearing sleeves 2 and 3 at the height of their parting line. The flanges 33 and 34 of the bearing block 5 and the bearing housing 4, which are inserted prior to fixing the bearing housing 4 in its place, are adjusted by inserting shims. To permit slight rotation in the horizontal plane about the vertical axis of the bearing, the two inner fitting members 29 and 30 are provided with a spherical contact surface; this may be seen from the horizontal cross section in FIG. 3. The two outer fitting members 28 and 29 are held together by screws while the inner fitting member 30 can be inserted loosely.

Easy and automatic adjustment of the aforementioned bearing by means of the separately provided hemispherical bearing support is thus assured. As described, the bearing is supported in a floating manner on the one hand, and also has a substantially smaller friction radius compared to the spherical support surfaces of previous bearing sleeves. In accordance with the invention, the diameter or the projected area, of the load-carrying bearing support depends on the existing oil pressure of the oil wedge in the bearing proper. It is here that the oil wedge must be capable of establishing a load-carrying lubricating film underneath the bearing support.

As shown in FIG. 1, the lower bearing sleeve 3 is held by the hemispherical bearing support 11 with the interposition of adjustment member 6. However, it is also possible to hold the lower bearing sleeve directly in the bearing support 11.

We claim:

1. Radial bearing for machine shafts comprising a bearing housing disposed about a shaft; bearing sleeve means having upper and lower sections, respectively, disposed within said bearing housing, said lower section being seated in place by a separate hemispherical bearing support; bearing block means; a ball-cup-like recess provided in said bearing block means adapted to seat said hemispherical bearing support; and means intermediate said hemispherical bearing support and said bearing block means for providing a lubricating medium therebetween, including adjustment means disposed intermediate said lower section and said bearing support, said adjustment means having a generally U-shaped configuration and being adapted to cooperate with said lower section.

2. Radial bearing as claimed in claim 1, wherein said adjustment means are provided with longitudinally extending members which cooperate with lateral recess means in said lower section.

3. Radial bearing as claimed in claim 1, wherein the top surface of said hemispherical bearing support includes a cylindrically shaped recess adapted to receive said lower section.

4. Radial bearing as claimed in claim 1 wherein the top surface of said hemispherical bearing support includes a cylindrically shaped recess adapted to receive said adjustment means.

5. Radial bearing as claimed in claim 1, including shims disposed between said lower section and said adjustment means for adjusting said bearing sleeve means.

6. Radial bearing as claimed in claim 1, wherein fitting members having spherical contact surfaces are disposed between said upper and lower sections of said bearing sleeve means and are adapted to permit adjustment with respect to said shaft.

7. Radial bearing for machine shafts comprising a bearing housing disposed about the shaft as well as a sleeve divided in a horizontal plane, into upper and lower bearing sleeves, the lower bearing sleeve being supported by a separate bearing support the underside of which is shaped hemispherically with a smaller radius of curvature than that of the bearing sleeve, a bearing block, said bearing support being disposed in a corresponding ball-cup shaped recess of said bearing block under liquid friction.

* * * * *